UNITED STATES PATENT OFFICE.

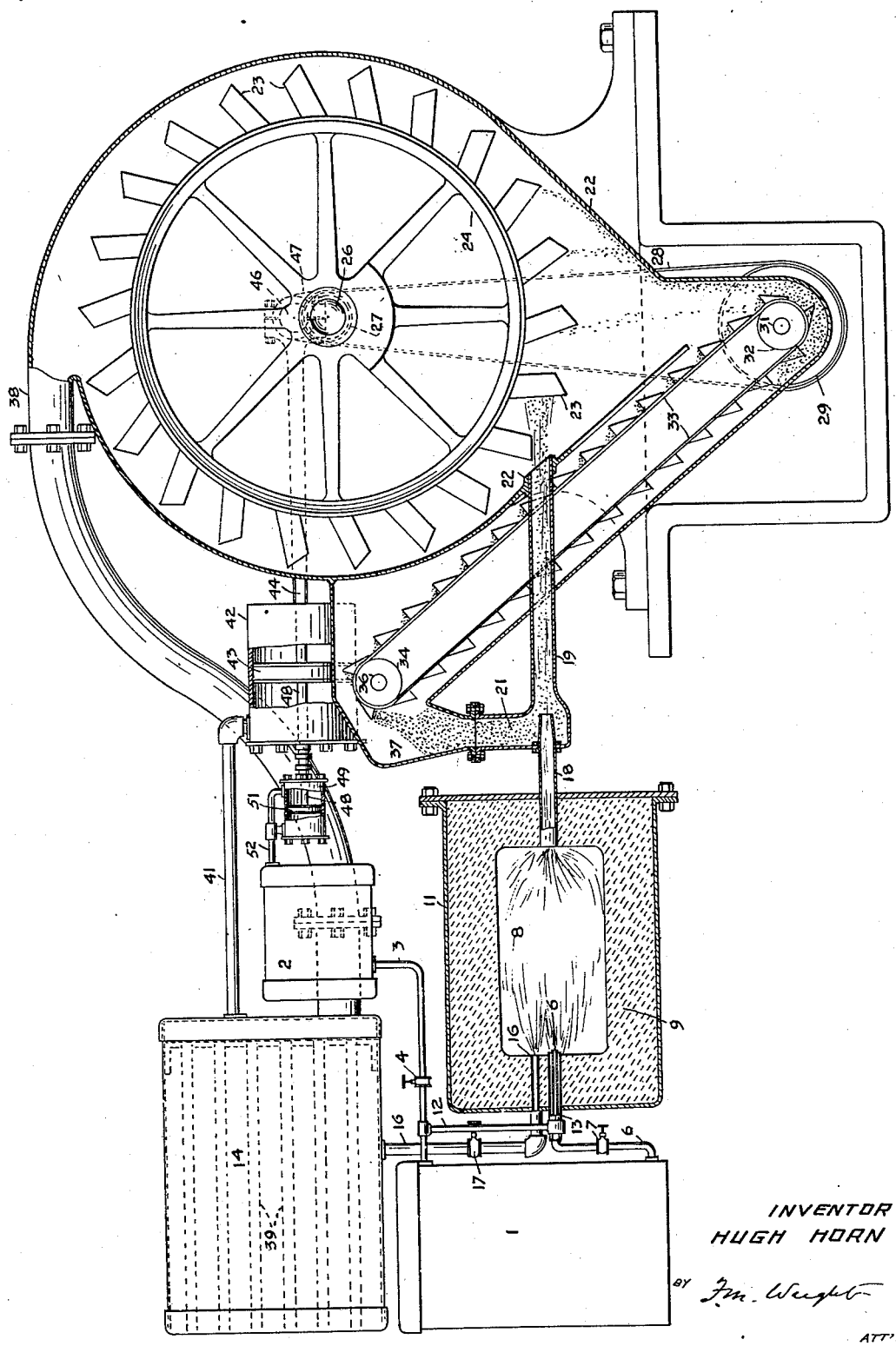

HUGH HORN, OF SAN FRANCISCO, CALIFORNIA.

ROTARY GAS-ENGINE.

1,302,659. Specification of Letters Patent. Patented May 6, 1919.

Application filed January 4, 1919. Serial No. 269,659.

*To all whom it may concern:*

Be it known that I, HUGH HORN, a citizen of the United States, residing at San Francisco, in the county of San Francisco and State of California, have invented new and useful Improvements in Rotary Gas-Engines, of which the following is a specification.

The object of the present invention is to provide an improved prime motor, employing, as its source of power, any liquid or pulverized solid fuel, and which will be of great efficiency.

In the accompanying drawing, the figure is a side view, partly in vertical longitudinal section, of my improved motor.

Referring to the drawing 1 indicates a fuel tank and 2 a compressed air reservoir. A pipe 3, controlled by a valve 4, leads from said compressed air reservoir to the top of the fuel tank, and by reason of the pressure of the air conducted in said pipe 3, the liquid or pulverized solid fuel in said tank is expelled through a pipe 6, having a controlling valve 7 therein, and discharging into a combustion chamber 8, surrounded by a lining 9 of refractory material and inclosed within a casing 11. A branch pipe 12 leads from said pipe 3, between the valve 4 and the tank 1, and conducts to an air pipe 13 surrounding the terminal portion of the pipe 6 and discharging into the combustion chamber around the outlet for the fuel. The air in said reservoir 2 being at a high pressure, the fluid or pulverized solid fuel is very finely divided, as it is discharged into said combustion chamber 8 and is burnt therein.

Air to support combustion of said fuel is also supplied by a compressed air tank 14, from which leads a pipe 16 controlled by a valve 17, and discharging through the casing 11 and refractory lining 9 into the combustion chamber 8.

The highly heated products of combustion under great pressure are forced through the open outlet end of a tube 18 communicating at its inner end with the combustion chamber 8 and discharging into an elbow-shaped conduit 19 into a mass of minute particles of sand 21 or other material which will not disintegrate or volatilize at the necessarily high temperature employed. The momentum of the escaping gases is transmitted to said sand or other pulverent material, which escapes from said nozzle through a casing 22 and it impinges against the pockets 23 of a wheel 24 similar to a Pelton water wheel, mounted upon a shaft 26. However, my invention is by no means limited to the exact form of wheel employed, as any wheel having vanes or other impact devices may be employed to carry out my invention and give good results. Around a small pulley 27 on said shaft is a band 28 which also surrounds a pulley 29 on a shaft 31 journaled in the casing 22 and carrying a roller 32 around which travels a conveyer 33, said conveyer also rotating around a roller 34 on a shaft 36, by which conveyer said sand or other pulverulent material is elevated and discharged into a chute 37, dropping by gravity into a position to be again impelled along the tube 19 and driven against the buckets of the Pelton water wheel. The products of combustion within the casing 22, escape by a circumferentially directed pipe 38 leading to a head of a compressed air tank 14 communicating, in the interior of said tank, with a series of longitudinally extending tubes 39 therein, and escaping from the other head of said tank into the atmosphere. Said tank 14 is filled with compressed air which is thus heated by said exhaust and its pressure therefore increased, and the compressed air is supplied to said reservoir by a pipe 41 leading from a single-acting air pump 42, in which a plunger 43 is reciprocated by rod 44 the outer end of which is secured around a wrist pin 46 on a crank 47 on the shaft 26. The plunger 43 of said air pump is connected with a rod 48 extending through the closed end of said air pump and also through an end of a double-acting high-pressure air pump 49 and is connected at its other end with a plunger 51 in the latter pump, said pump communicating at both ends with a pipe 52 leading to the compressed air reservoir 2.

The wheel and buckets are formed of material capable, notwithstanding the high temperature to which they are raised, of resisting erosion by the pulverulent material employed.

It is to be understood that by the term "fluid fuel" I intend to include not only liquid fuel but also solid fuel in a pulverulent and therefore fluid form.

I claim:—

1. In combination, a combustion chamber, means for introducing thereinto fluid fuel and compressed air, a tube leading from said combustion chamber to conduct therefrom products of combustion under high pressure, a conduit for conducting solid material in small particles, one portion of said conduit being in approximate alinement with said tube, said tube discharging into said latter portion, and a wheel having a circular series of impact devices successively moved by its rotation into a position in alinement with said portion of said conduit to be impinged upon by said material flowing therethrough.

2. In combination, a combustion chamber, means for introducing thereinto fluid fuel and compressed air, a tube leading from said combustion chamber to conduct therefrom products of combustion under high pressure, a conduit for conducting solid material in small particles, one portion of said conduit being in approximate alinement with said tube, said tube discharging into said latter portion, a wheel having a circular series of impact devices successively moved by its rotation into a position in alinement with said portion of said conduit to be impinged upon by said material flowing therethrough a casing surrounding said wheel, and a conveyer, operated by the rotation of said wheel for conveying the solid material from a lower portion of said casing, to which it has dropped after impact against said devices to an upper portion from which it can drop into a position to be again driven forward by the products of combustion.

3. In combination, a combustion chamber, means for introducing thereinto fluid fuel and compressed air, a tube leading from said combustion chamber to conduct therefrom products of combustion under high pressure, a conduit for conducting solid material in small particles, one portion of said conduit being in approximate alinement with said tube, said tube discharging into said latter portion, a wheel having a circular series of impact devices successively moved by its rotation into a position in alinement with said portion of said conduit to be impinged upon by said material flowing therethrough and means, operated by the rotation of said wheel, for compressing the air supplied to said fuel.

4. In combination, a combustion chamber, means for introducing thereinto fluid fuel and compressed air, a tube leading from said combustion chamber to conduct therefrom products of combustion under high pressure, a conduit for conducting solid material in small particles, one portion of said conduit being in approximate alinement with said tube, said tube discharging into said latter portion, a wheel having a circular series of impact devices successively moved by said tube, said tube discharging into said latter portion, a wheel having a circular series of impact devices successively moved by its rotation into a position in alinement with said portion of said conduit to be impinged upon by said material flowing therethrough means, operated by the rotation of said wheel, for compressing the air supplied to said fuel, and means for conducting the waste exhaust gases into close proximity with said compressed air to heat the same.

HUGH HORN.